various forms of comic and thoughtful responses—

United States Patent
Guedalia et al.

[11] Patent Number: 5,963,213
[45] Date of Patent: Oct. 5, 1999

[54] METHOD AND SYSTEM FOR ACCELERATING WARPING

[75] Inventors: Isaac David Guedalia, Bet Shemesh; Marc Berger, Rehovot, both of Israel

[73] Assignee: Olivr Corporation Ltd., Jerusalem, Israel

[21] Appl. No.: 08/852,496

[22] Filed: May 7, 1997

[51] Int. Cl.$^6$ .................................................. G06T 7/40
[52] U.S. Cl. ...................................... 345/425; 345/473
[58] Field of Search ................................ 345/473, 427, 345/429, 433

[56] References Cited

U.S. PATENT DOCUMENTS

| | | | |
|---|---|---|---|
| 5,175,808 | 12/1992 | Sayre | 345/433 |
| 5,179,638 | 1/1993 | Dawson et al. | 345/427 |
| 5,204,944 | 4/1993 | Wolberg | 345/427 |
| 5,209,944 | 5/1993 | Opower et al. | 427/569 |
| 5,224,208 | 6/1993 | Miller | 345/425 |
| 5,307,451 | 4/1994 | Clark | 345/427 |
| 5,338,200 | 8/1994 | Olive | 434/43 |
| 5,396,583 | 3/1995 | Chen et al. | 345/427 |
| 5,402,533 | 3/1995 | Kelley et al. | 345/426 |
| 5,412,764 | 5/1995 | Tanaka | 345/424 |
| 5,442,738 | 8/1995 | Chapman et al. | 345/435 |
| 5,446,833 | 8/1995 | Miller et al. | 345/425 |
| 5,544,283 | 8/1996 | Kaufman et al. | 345/424 |
| 5,550,959 | 8/1996 | Freeman | 345/427 |
| 5,550,960 | 8/1996 | Shirman et al. | 345/430 |
| 5,561,756 | 10/1996 | Miller et al. | 345/455 |
| 5,574,836 | 11/1996 | Broemmlsiek | 345/427 |
| 5,577,176 | 11/1996 | Friedman et al. | 345/427 |
| 5,579,456 | 11/1996 | Cosman | 345/428 |
| 5,583,975 | 12/1996 | Naka et al. | 345/426 |
| 5,586,231 | 12/1996 | Florent et al. | 345/425 |
| 5,586,232 | 12/1996 | Yoshida | 345/427 |
| 5,586,246 | 12/1996 | Nobori et al. | 395/502 |
| 5,590,250 | 12/1996 | Lamping et al. | 345/427 |
| 5,593,599 | 1/1997 | Wright et al. | 210/764 |
| 5,594,676 | 1/1997 | Greopain et al. | 364/724.01 |
| 5,594,843 | 1/1997 | O'Neill | 345/427 |
| 5,594,844 | 1/1997 | Sakai et al. | 345/427 |
| 5,594,845 | 1/1997 | Florent et al. | 345/427 |
| 5,608,850 | 3/1997 | Robertson | 345/448 |
| 5,613,048 | 3/1997 | Chen et al. | 345/419 |
| 5,619,319 | 4/1997 | Muraoka | 356/73 |

*Primary Examiner*—Mark R. Powell
*Assistant Examiner*—Huedung X. Cao
*Attorney, Agent, or Firm*—Darby & Darby

[57] ABSTRACT

A method for transforming a source digital image into a target digital image to produce an effect of warping including identifying pixel locations within the target image, identifying pixel locations within the source image associated with the pixel locations within the target image, and copying the pixel attribute values from a source neighborhood of each pixel location within the source image, the source neighborhood being defined by means of a source acceleration pixel template, into pixel attribute values for the corresponding pixel locations in a target neighborhood of each associated pixel location within the target image, the target neighborhood being defined by means of a target acceleration pixel template containing at least two pixel locations. A system for carrying out the method is also described and claimed.

32 Claims, 7 Drawing Sheets

METHOD AND SYSTEM FOR ACCELERATING WARPING

FIELD OF THE INVENTION

The present invention relates to computer graphics, and specifically to image warping.

BACKGROUND OF THE INVENTION

Environment maps are used to create perspective views of a curved panoramic scene. An environment map is an image depicting the appearance of a scene, as it is perceived when viewed from a specific location. Perspective views are obtained by mapping the environment map onto appropriate view planes.

Cylindrical environment maps are used in the Apple QUICKTIME® software system. A camera is positioned in a fixed location, and multiple photographs are taken as the camera swivels in azimuth. The photographs are digitized and processed by a "stitcher" to produce a warped panorama. The QUICKTIME® player employs projective geometry to project the panorama onto a view plane which changes in response to interactive panning and zooming, controlled by a user.

In U.S. Pat. No. 5,396,583 entitled CYLINDRICAL TO PLANAR IMAGE MAPPING USING SCANLINE COHERENCE, the disclosure of which is hereby incorporated by reference, there is described a method and system for optimizing the speed of the projective warping calculation for cylindrical environment maps by decomposing the warping calculations into horizontal scanline scaling followed by vertical scanline scaling. The horizontal and vertical scalings are one-dimensional, and as such can be carried out rapidly.

In U.S. Pat. Nos. 5,446,833 and 5,561,756 relating respectively to a TEXTURE SPHERE ENVIRONMENT MAP RENDERING METHOD AND SYSTEM the disclosure of which is hereby incorporated by reference, there is described a method and system for optimizing the speed of the projective warping calculation for spherical environment maps.

SUMMARY OF THE INVENTION

The present invention seeks to provide a method and system for accelerating the warp speed in an interactive display system. It also seeks to provide a method and system for performing a mouse-centered zoom. It also seeks to provide a method and system for controlling viewing parameters so that they do not exceed limitations imposed by the vertical extent of the panorama.

There is thus provided in accordance with a preferred embodiment of the present invention a method for transforming a source digital image into a target digital image to produce an effect of warping including identifying pixel locations within the target image, identifying pixel locations within the source image associated with the pixel locations within the target image, and copying the pixel attribute values from a source neighborhood of each pixel location within the source image, the source neighborhood being defined by means of a source acceleration pixel template, into pixel attribute values for the corresponding pixel locations in a target neighborhood of each associated pixel location within the target image, the target neighborhood being defined by means of a target acceleration pixel template containing at least two pixel locations.

Pixel attribute values may be color values in a color image or monochromatic values in a gray-scale image.

Moreover in accordance with a preferred embodiment of the present invention at least one of the source acceleration template and the target acceleration template varies depending on the speed with which a user is panning or zooming on the source image.

Additionally in accordance with a preferred embodiment of the present invention at least one of the source acceleration template and the target acceleration template varies depending on available memory for storing necessary data.

Further in accordance with a preferred embodiment of the present invention at least one of the source acceleration template and the target acceleration template varies depending on placement of the pixel location within the source image.

Still further in accordance with a preferred embodiment of the present invention, at least one of the source acceleration template and the target acceleration template varies depending on a zoom level.

Moreover in accordance with a preferred embodiment of the present invention at least one of the source acceleration template and the target acceleration template is determined by a desired quality level.

Further in accordance with a preferred embodiment of the present invention the source digital image is a digitized environment map of a scene.

Still further in accordance with a preferred embodiment of the present invention the source digital image is a frame of a movie.

There is also provided in accordance with a preferred embodiment of the present invention a digital image processing system for transforming a source digital image into a target digital image to produce an effect of warping including an address generator for identifying pixel locations within the target image, an address generator for identifying pixel locations within the source image associated with the pixel locations within the target image, and a memory manager operative to copy pixel attribute values from a source neighborhood of each pixel location within the source image, the source neighborhood being defined by means of a source acceleration pixel template, into pixel attribute values for corresponding pixel locations in a target neighborhood of each associated pixel location within the target image, the target neighborhood being defined by means of a target acceleration pixel template containing at least two pixel locations.

Moreover in accordance with a preferred embodiment of the present invention at least one of the source acceleration template and the target acceleration template varies depending on the speed with which a user is panning or zooming.

Additionally in accordance with a preferred embodiment of the present invention at least one of the source acceleration template and the target acceleration template varies depending on available memory for storing necessary data.

Further in accordance with a preferred embodiment of the present invention at least one of the source acceleration template and the target acceleration template varies depending on placement of the pixel locations within the source image.

Still further in accordance with a preferred embodiment of the present invention at least one of the source acceleration template and the target acceleration template varies depending on a zoom level.

Moreover in accordance with a preferred embodiment of the present invention at least one of the source acceleration template and the target acceleration template is determined by a desired quality level.

Further in accordance with a preferred embodiment of the present invention the source digital image is a digitized environment map of a scene.

Still further in accordance with a preferred embodiment of the present invention the source digital image is a frame of a movie.

There is also provided in accordance with a preferred embodiment of the present invention a method for interactively zooming in or out of a digitized scene being projected on a view surface while keeping fixed a specified point in the view surface located other than at the center of the view surface, including identifying the specified point in the view surface, identifying a pre-zoom and post-zoom viewing distance from the view surface, and computing a modified view surface in such a manner that the specified point in the modified view surface maps to the same point in the digitized scene when using either the pre-zoom or the post-zoom viewing distance.

Preferably, but not necessarily, the view surface is a view plane.

Moreover in accordance with a preferred embodiment of the present invention the specified point in the view surface corresponds to the position of a mouse cursor.

Additionally in accordance with a preferred embodiment of the present invention computing a modified view surface includes computing of at least one of modified vertical view elevation and modified horizontal view angle.

Further in accordance with a preferred embodiment of the present invention the digitized scene is a digitized environment map of a scene.

Still further in accordance with a preferred embodiment of the present invention the digitized scene is a frame of a movie.

There is also provided in accordance with the present invention in accordance with a preferred embodiment of the present invention a digital image processing system for interactively zooming in or out of a digitized scene being projected on a view surface while keeping fixed a specified point in the view surface located other than at the center of the view surface, including a spatial coordinate register for storing spatial coordinates of said specified point, viewing distance registers for storing the values of the pre-zoom and post-zoom viewing distances from the view surface; and a processor for computing a modified view surface in such a manner that the specified point in the modified view surface maps to the same point in the digitized scene when using either the pre-zoom or the post-zoom viewing distance.

The view surface is preferably, but not necessarily, a view plane.

Moreover in accordance with a preferred embodiment of the present invention the specified point in the view surface corresponds to the position of a mouse cursor.

Additionally in accordance with a preferred embodiment of the present invention the processor computes at least one of modified vertical view elevation and modified horizontal view angle.

Further in accordance with a preferred embodiment of the present invention the digitized scene is a digitized environment map of a scene.

Still further in accordance with a preferred embodiment of the present invention the digitized scene is a frame of a movie.

There is also provided in accordance with a preferred embodiment of the present invention a method for controlling interactive warping of a digital panorama image for displaying a projected view of the panorama on a view surface, so that the projected view does not require access to pixel data outside the dimension limits of the panorama, the projected view being determined by viewing parameters including a vertical elevation viewing parameter and a distance viewing parameter, the method including calculating minimum and maximum values for the vertical elevation viewing parameter for a given value of the viewing distance parameter, comparing a requested value of the vertical elevation viewing parameter with the minimum and maximum values, adjusting the requested value of the vertical elevation viewing parameter so that it does not fall below or above the minimum and maximum values, respectively, and warping the panorama based at least on the adjusted vertical elevation viewing parameter.

Preferably, but not necessarily, the view surface is a view plane.

There is also provided in accordance with a preferred embodiment of the present invention an image processing system for controlling interactive warping of a digital panorama image for displaying a projected view of the panorama on a view surface, so that the projected view does not require access to pixel data outside the dimension limits of the panorama, the projected view being determined by viewing parameters including a vertical elevation viewing parameter and a distance viewing parameter, the system including a processor for calculating minimum and maximum values for the vertical elevation viewing parameter for a given value of the viewing distance parameter, a logic processing unit for comparing a requested value of the vertical elevation viewing parameter with the minimum and maximum values, an arithmetic unit for adjusting the requested value of the vertical elevation viewing parameter so that it does not fall below or above the minimum and maximum values, respectively, and a renderer for warping the panorama based at least on the adjusted vertical elevation viewing parameter.

Preferably, but not necessarily, the view surface is a view plane.

BRIEF DESCRIPTION OF THE DRAWINGS

The present invention will be understood and appreciated more fully from the following detailed description, taken in conjunction with the drawings in which.

LIST OF APPENDICES

Appendix A is a listing of sample software for warping in accordance with the prior art;

Appendix B is a listing of sample software for accelerated warping in accordance with a preferred embodiment of the present invention; and Appendix C is a listing of sample software for non-centered zoom in accordance with a preferred embodiment of the present invention.

DETAILED DESCRIPTION OF PREFERRED EMBODIMENTS

The present invention provides apparatus and techniques for image warping and includes three embodiments relating respectively to accelerated warping, non-centered zoom and boundary window control. The present invention relates to mapping environment maps onto a view surface. The view surface is normally planar but is not limited to planar surfaces. For the sake of simplicity in description, all references in the specification are to view planes, it being understood that the invention is also applicable to non-planar view surfaces.

Figure 1:
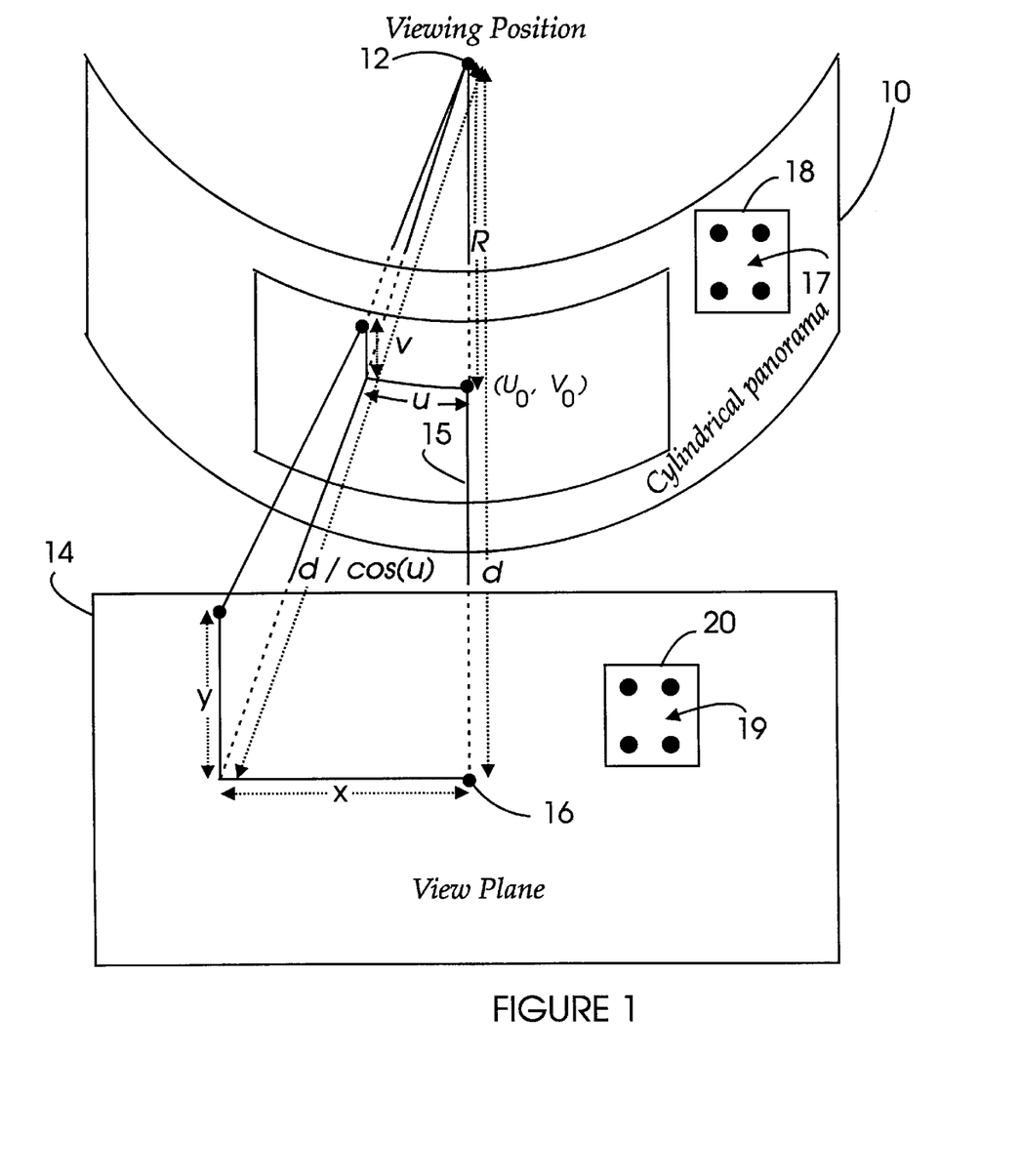
FIG. 1 is a simplified illustration of cylindrical warping in accordance with a preferred embodiment of the present invention when the view plane has no off-vertical slant.

Reference is now made to FIG. 1, which illustrates accelerated cylindrical warping in accordance with a preferred embodiment of the present invention when a view plane has no off-vertical slant. A panoramic image 10 is shown as a two-dimensional array of pixels arranged on the surface of a cylinder and identified by environment map coordinates u and v, where u (in pixels) measures the horizontal position, and v (in pixels) measures the vertical elevation in the environment map. The parameter v is measured with respect to the height of the viewer's eye; i.e. v=0 along the viewer horizon.

The radius of the cylinder (in pixels) is denoted by R, and is such that the total width, or circumference, of the cylinder (in pixels) is given by $2\pi R$, in case the panorama is 360° in circumference, or more generally by eR, in case the panorama circumference is an angle e (in radians), which may be less than 360°. The center 12 of the cylinder is taken as the viewing position.

A view plane 14 is characterized by three dynamic viewing parameters: $U_0$, $V_0$ and d, where $U_0$ (in pixels) and $V_0$ (in pixels) are the cylindrical coordinates of the point in the environment map through which passes the ray of vision 15 from the viewing position. The parameter d (in pixels) is the distance from the viewing position to the view plane, measured along the perpendicular thereto, which is the ray of vision. The parameter $V_0$ is measured relative to the viewer horizon, so that $V_0=0$ when the view plane has no off-vertical slant. The coordinates of the view plane are denoted by x and y, where x (in pixels) measures the horizontal displacement from the center of the view plane, and y (in pixels) measures the vertical displacement from the center of the view plane. In FIG. 1, the center of the view plane is indicated as the point 16.

In addition to the three dynamic viewing parameters $U_0$, $V_0$ and d, which are adjusted in response to user interactivity, there are also two static viewing parameters—namely, the dimensions of the view plane itself, which corresponds to the size of image being displayed.

It can be seen from the geometry of FIG. 1 (by using similar triangles) that the relationship between the (x, y) coordinates in the view plane and the corresponding (u, v) coordinates in the cylinder is given by:

$$u=U_0+R \tan^{-1}(x/d), v=r\, y \cos[(u-U_0)/R]/d. \qquad (1)$$

The variable r here denotes the "scaled radius," used to account for the fact that the pixel sampling density in the vertical dimension may not be the same as the pixel sampling density in the horizontal dimension. If the sampling densities are the same, then r=R. Otherwise, r is determined by multiplying R by a suitable scale factor, as described hereinbelow with reference to equation (6).

In accordance with a preferred embodiment of the invention, color or monochromatic values from source neighborhoods 17 of pixel locations within the panoramic image 10, the source neighborhoods 17 each being defined by means of a source acceleration pixel template 18, are copied into color or monochromatic values for corresponding pixel locations in target neighborhoods 19 of associated pixel locations within the view plane 14, the target neighborhoods each being defined by means of a target acceleration pixel template 20 containing at least two pixel locations. This copying will be described hereinbelow in greater detail with reference to FIG. 5.

Figure 2:
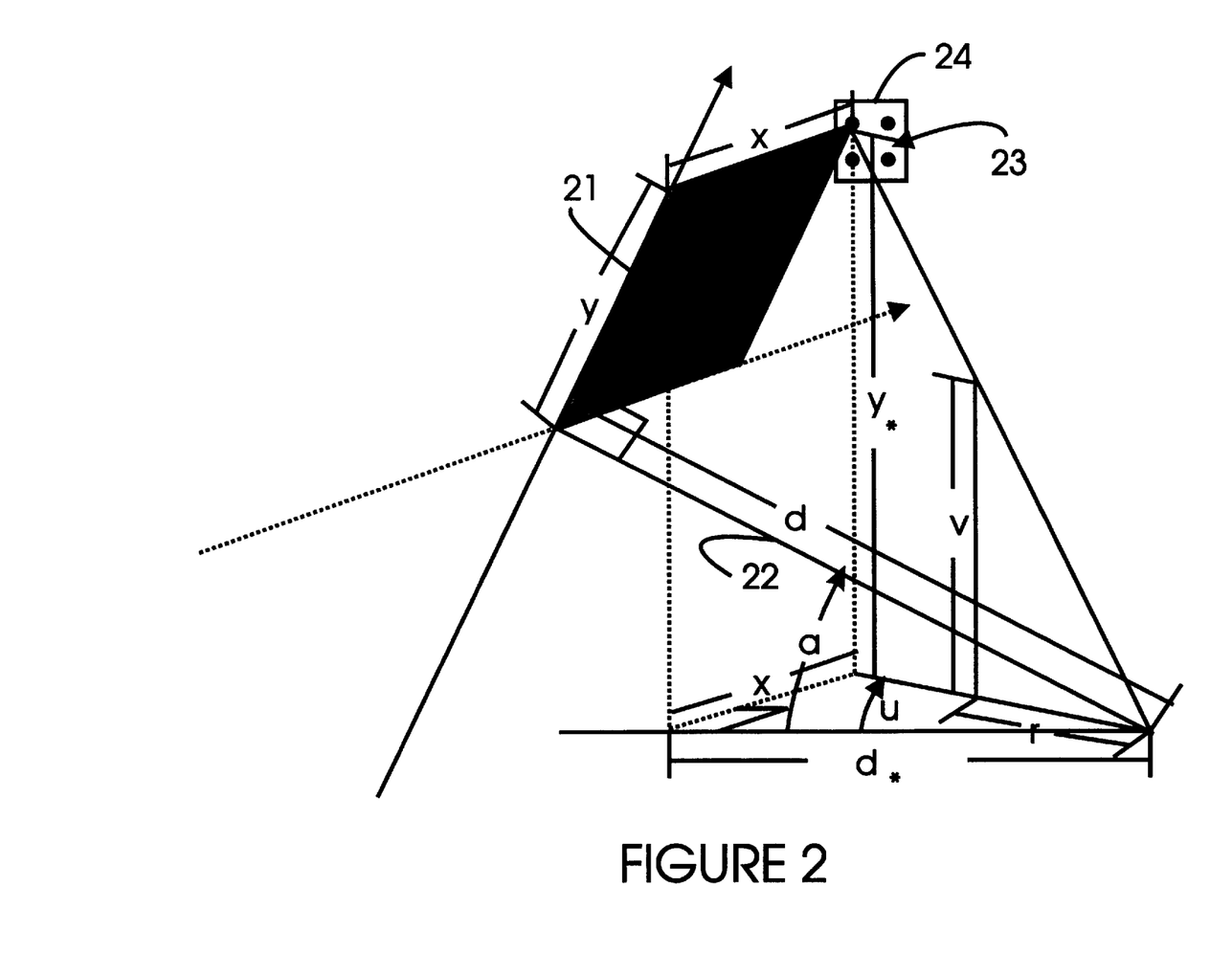
FIG. 2 is a simplified illustration of cylindrical warping in accordance with a preferred embodiment of the present invention when the view plane has an off-vertical slant.

Reference is now made to FIG. 2, which illustrates accelerated cylindrical warping in accordance with a preferred embodiment of the present invention when a view plane 21 has an off-vertical slant. The off-vertical slant is measured by an angle a (in degrees), which measures the angle of elevation of the ray of vision 22. In terms of the viewing elevation parameter $V_0$, the angle a is determined by $$a=\tan^{-1}(V_0/r). \qquad (2)$$

Again, it can be seen that the relationship between the (x, y) coordinates in the view plane and the corresponding (u, v) coordinates in the cylinder is given by:

$$u=U_0+R \tan^{-1}(x/d^*), v=r\, y^* \cos[(u-U_0)/R]/d^*, \qquad (3)$$

where $d^*$ and $y^*$ are the coordinates d and y rotated by the angle a; i.e.

$$d^*=d \cos(a)-y \sin(a), y^*=d \sin(a)+y \cos(a). \qquad (4)$$

It can be seen from these equations that in addition to the viewing parameters $U_0$, $V_0$ and d, which are dynamically updated in response to interactive inputs, there are four panorama variables which are used to define the properties of the panorama; namely, the scaled radius r (in pixels), the height h (in pixels) of the viewer horizon in the panorama, the total height H (in pixels) of the panorama, and the total width W (in pixels) of the panorama. The scaled radius r enters directly into equation (3).

The viewer horizon h enters indirectly, in that the variables v and $V_0$ are all measured relative to h, so that v=0 or $V_0=0$ correspond to a height of h pixels from the bottom of the panorama. The total height H is used to limit the value of $V_0$ so that the variable v never exceeds H, as described more fully below. Otherwise, if v were to exceed H, then access to pixels outside the dimension limit of the panorama would be required.

The total width W is used to compute the radius R, which enters directly into equation (3). It is also used whenever the panorama is not a full 360° in circumference. In this case it is used to limit the value of $U_0$ so that the variable u never exceeds W. If the panorama is a full 360° in circumference, then W is also used for memory access, to know how to wrap around from the right end of the panorama back to the left end, and vice versa.

Thus it can be seen that there are two types of variables which enter into warping:

viewing parameters which define the user's view plane which is interactively being changed (three dynamic variables and two static variables, as described above); and panorama parameters which define the properties of the panorama (four static parameters).

The properties of the panorama are described by a bitmap containing the pixel data; i.e. the list of color or monochromatic values for each pixel, together with the four parameters r, h, H and W defined above.

The static panorama variables r and h are typically not prescribed directly. Instead, two field of view angles (in degrees) are prescribed, $f_1$, and $f_2$, which define the vertical angles from the viewer horizon to the top of the panorama and from the viewer horizon to the bottom of the panorama, respectively. From these angles, one can determine r and h as follows:

$$h = H \tan(f_2)/[\tan(f_1) + \tan(f_2)], \quad (5)$$

$$r = h/\tan(f_2). \quad (6)$$

Thus it can be seen that the scale factor for converting the true radius, R, to the scaled radius, r, is given by $$r/R = 2\pi h/[W \tan(f_2)]. \quad (7)$$

Conversely, if necessary, the field of view angles can be determined from r and h as follows:

$$f_1 = \tan^{-1}[(H-h)/r], \quad (8)$$

$$f_2 = \tan^{-1}(h/r). \quad (9)$$

In the absence of field of view angles being prescribed, default values for r and h can be used as follows. The default for h can be the middle of the panorama; i.e.

$$h = H/2, \quad (10)$$

and the default for r can be based the true radius R. If the panorama is a full 360°, then this amounts to taking $$r = R = W/2\pi. \quad (11)$$

Otherwise, if the panorama circumference is some angle e (in radians), less than 360°, then r can be taken as $$r = R = W/e. \quad (12)$$

Using the circumference as a basis for calculating r amounts to an "isotropic" assumption about the pixel sampling of the digital panorama, i.e. that the sampling density of pixels per angle is the same in both the horizontal and vertical dimensions. Typically this assumption is not valid, and hence the need to prescribe the panorama parameters $f_1$ and $f_2$, but for lack of such data, the isotropic assumption is most reasonable.

In accordance with a preferred embodiment of the invention, color or monochromatic values from source neighborhoods 17 (FIG. 1) of pixel locations within the panoramic image 10 (FIG. 1), the source neighborhoods each being defined by means of a source acceleration pixel template 18 (FIG. 1), are copied into color or monochromatic values for corresponding pixel locations in target neighborhoods 23 of associated pixel locations within the view plane 21, the target neighborhoods each being defined by means of a target acceleration pixel template 24 containing at least two pixel locations. This copying will be described hereinbelow in greater detail with reference to FIG. 5.

Figure 3:
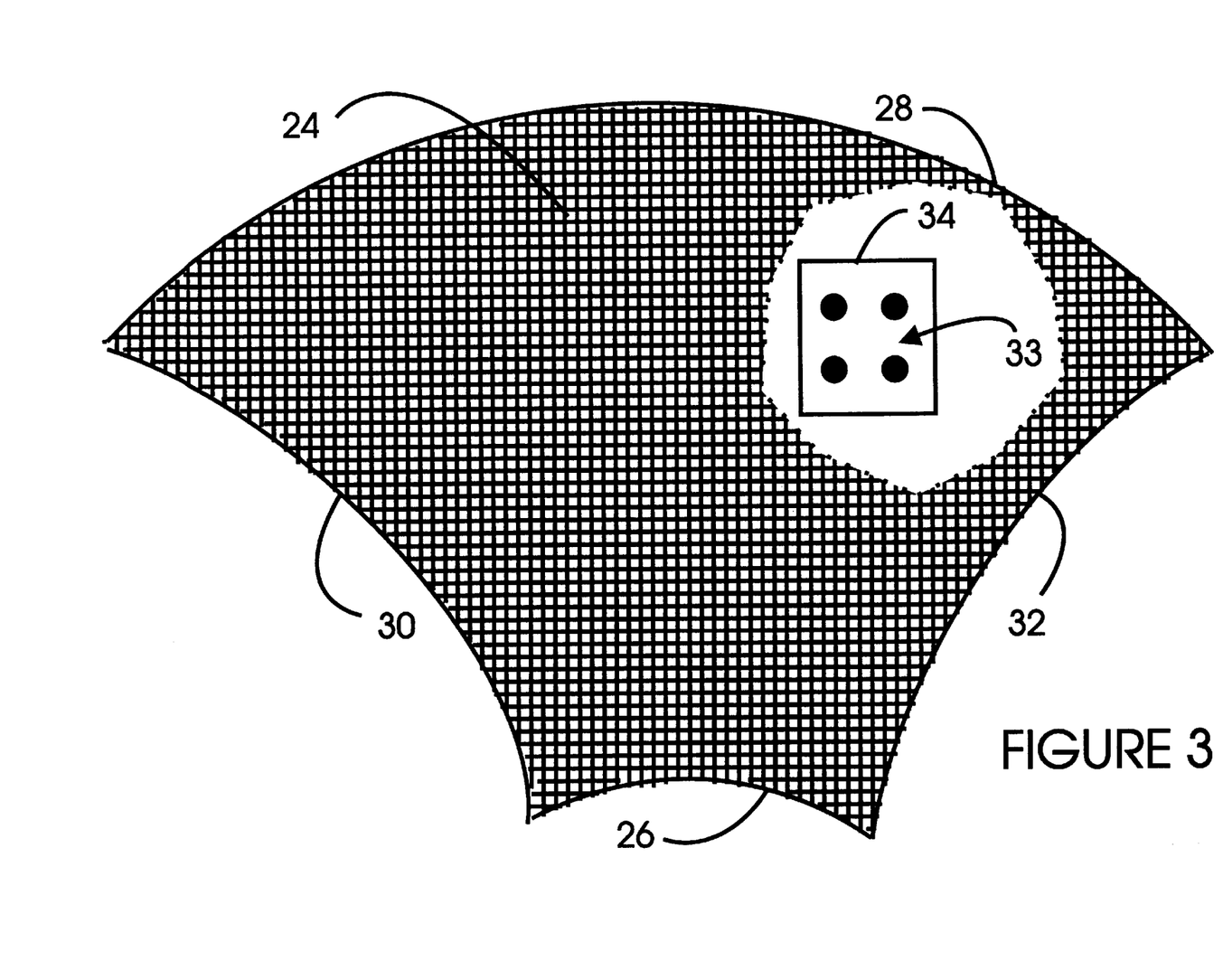
FIG. 3 is a simplified illustration of a region of a cylindrical panoramic image corresponding to a rectangular view plane in FIG. 2.

Reference is now made to FIG. 3, which illustrates a region 25 of the cylindrical panoramic image corresponding to a rectangular view plane. Specifically, if y ranges between arbitrary values A and B then the bottom boundary 26 and top boundary 28 of the region 25 are given by the equations $$v = r \cos[(u-U_0)/R][d \tan(a) + A]/[d - A \tan(a)], \quad (13a)$$

and $$v = r \cos[(u-U_0)/R][d \tan(a) + B]/[d - B \tan(a)], \quad (13b)$$

respectively. Similarly, if x ranges between arbitrary values C and D then the left boundary 30 and right boundary 32 of the region 25 are given by the equations $$v \sin(a) = rd \sin[(u-U_0)/R]/C - r \cos(a) \cos[(u-U_0)/R], \quad (14a)$$

and $$v \sin(a) = rd \sin[(u-U_0)/R]/D - r \cos(a) \cos[(u-U_0)/R], \quad (14b)$$

respectively

FIG. 3 illustrates source neighborhoods 33 of pixel locations within the panoramic image 10, the source neighborhoods 33 each being defined by means of a source acceleration pixel template 34. The functionality of these source neighborhoods in accordance with the present invention will be described hereinbelow in greater detail with reference to FIG. 5.

A listing of sample software for implementing warping according to the prior art is included in Appendix A. The member function findLogicalwindow ( ) calculates the rectangular window of the panorama which surrounds a region such as the region 25 of FIG. 3, and the member function Warp ( ) carries out the warp between the region of the panorama delineated in findLogicalWindow ( ) and the target warped image.

As can be seen in the listing of the code, for the specific implementation illustrated, two arrays, UArray and Varray, have been designated to set up indices. (In an alternate implementation, it is possible to avoid use of these arrays, as described below.) These arrays hold the pixel addresses for the pixels of the panorama image whose color or monochromatic values are to be copied into the pixels at location (j, i) in the target warped (rectangular) image.

Figure 4:
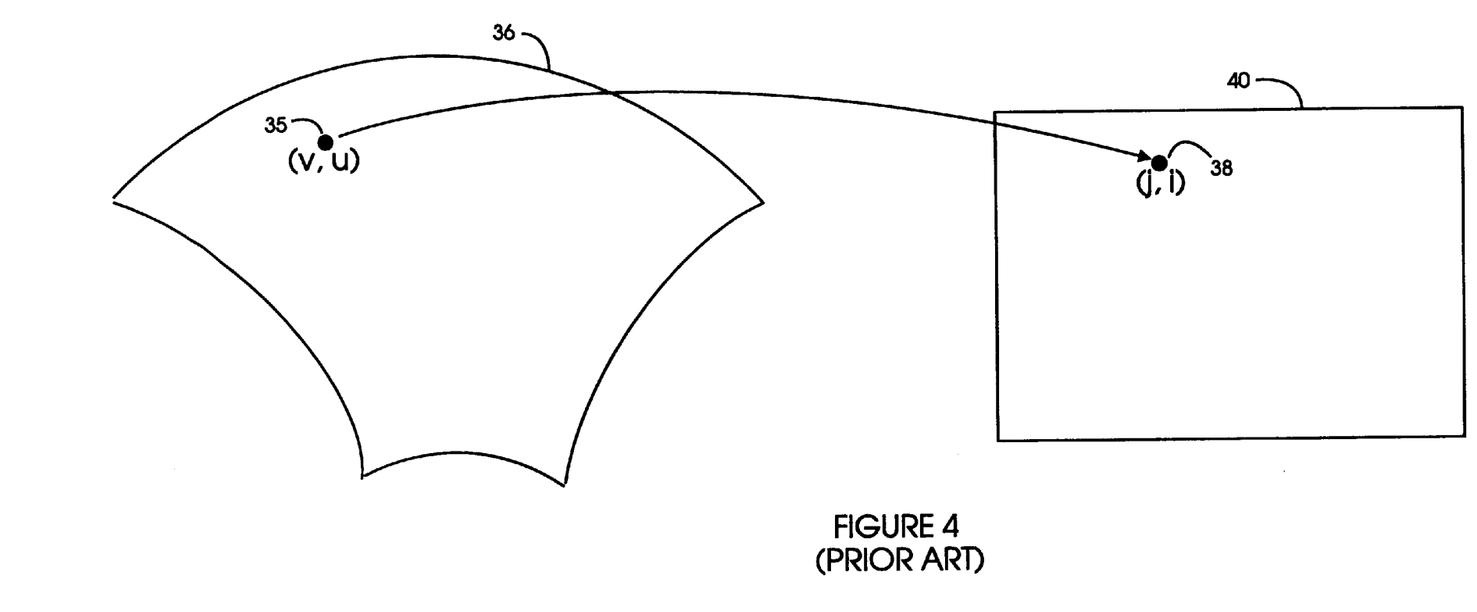
FIG. 4 is a simplified drawing of mapping from source image to target image used to carry out an image processing calculation for warping in the prior art.

Reference is now made to FIG. 4 which depicts the mapping from pixel (v, u) denoted by numeral 35 within the region 36 to pixel (j, i) denoted by numeral 38 within the target warped image rectangular region 40 in accordance with the prior art. This mapping is carried out for every pixel (j, i) within the region 40. The arrays UArray and VArray have been designated to pre-compute the array of values of u and v which correspond to each pixel (j, i).

Most of the calculational time in the mapping of FIG. 4 according to the prior art is spent in the double loop shown in the prior art code listing of Appendix A, processing the three lines:

```
Utemp   = atan((X0 – j)/ denom * cosTerm);
*pU++   = r * Utemp;
*pV++   = alignmentT * (long)(shiftV + y * cos(Utemp));
```

The pointers pU and pV stride along the elements of UArray and VArray. The above calculations needs to be done inside the double loop, since the variable denom depends on the running index i, so that the expression for Utemp depends on both i and j. The number of iterations in the double loop is one half the size (in pixels) of the target window, the savings of one half being due to exploitation of left-right symmetry.

The processing load for carrying out the rendering for the warp is primarily due to three types of instructions:

(i) Calculating the entries for the UArray and VArray tables. Most of the processing load is in computing the inverse tangent and cosine terms listed above;

(ii) Accessing the pixels in the panorama bitmap pointed to by the pointers pU and pv, coming from the UArray and VArray tables; and (iii) Copying the color or monochromatic values from pixels in the panorama bitmap to pixels in the target display bitmap.

Steps (ii) and (iii) are carried out in the code listing by the lines at the end of Warp ( ) which copy *pT to *pB1 and *pB2.

The UArray and VArray tables need to be re-computed whenever the viewing parameters $V_0$ or d change; i.e. whenever the viewer moves vertically or zooms in or out. The decision whether or not to re-compute the tables appears in the code listing in Warp ( ) as:

if (d!=dold||v!=void) For a purely horizontal pan the tables do not have to be re-computed; rather, a shift term, shiftU, can be used to implement the horizontal offset. This appears in the listing as the lines:

U1=short(shiftU−*pU);

U2=short(shiftU+*pU); (Two lines are used here on account of the symmetry.)

Alternatively, it is not necessary to use tables to store the u and v values. Rather, it is possible to compute these values each time Warp ( ) is called, and not store them in memory. In some circumstances, such as the use of accelerated warping in accordance with the present invention, the processing overhead for table access can outweigh the processing for the warp calculations.

The present invention seeks to accelerate the speed of rendering warping, and to reduce memory requirements for storing any necessary tables. One approach which has been frequently used to accelerate image processing calculations is to sub-sample. Sub-sampling by two, for example, in each dimension, typically reduces the number of calculations by a factor of four. However, there are several problems with this approach.

Firstly, sub-sampled images need to be stretched back to their original dimensions for display, and this tends to produce a blurred image. Second, since the warping equations (3) and (4) are non-linear, a linear stretch destroys the panoramic look of the image.

Figure 5:
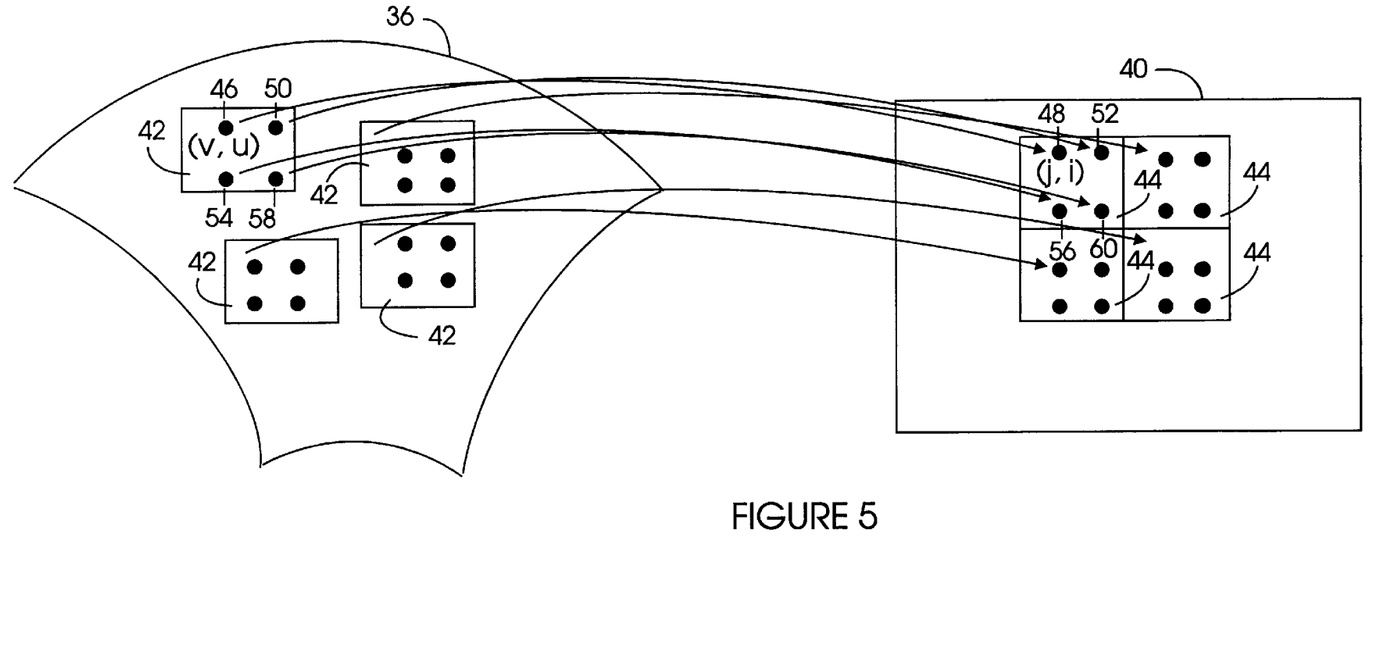
FIG. 5 is a simplified drawing of a system and method for accelerating image processing calculation in warping in accordance with a preferred embodiment of the present invention.

The present invention mitigates these difficulties by an alternate approach to sub-sampling. As indicated in FIG. 5, the table indices u and v are used to demarcate a 2×2 set 42 of pixel locations in the region 36, with upper left pixel located at (v, u). Each of the four pixel locations in set 42 is mapped to the corresponding pixel location in the 2×2 set 44 of pixel locations in the target image 40. That is, the upper left pixel location 46 is mapped to pixel location 48, the upper right pixel location 50 is mapped to pixel location 52, the lower left pixel location 54 is mapped to pixel location 56, and the lower right pixel location 58 is mapped to pixel location 60.

As indicated in FIG. 5. this is repeated for every 2×2 set 44 in the target image region 40, as j and i skip by two and range over the dimensions of the region 40. For each such 2×2 set 44 in the region 40 there is a corresponding set 42 which maps into it as described above. The sets 42 need not be aligned. They may have empty space between them, or, alternatively, they may partially overlap. The upper left pixel locations of the sets 42 correspond to the UArray and VArray tables—but only at every alternate j and i index.

It can thus be appreciated that to store the necessary locations requires computing only one fourth of the original UArray and VArray tables, for every alternate j and i index. This represents a reduction by a factor of four in computation, or processing time, and also in memory required to store the tables.

The 2×2 set referenced above is referred to as the "acceleration template," since it is used to delineate a set of pixel locations representing a neighborhood around the pixel location chosen for the UArray and VArray calculations. It is clear that the use of 2×2 sets in the above discussion is for illustrative purposes only. Any suitable set could be used instead. For example, a 3×4 pixel location rectangle could be used to reduce processing time and memory by a factor of twelve. Of course, the larger the rectangle, the more visible block discrepancy becomes.

More generally, as explained below, the acceleration template need not be a connected set of contiguous pixel locations. It can, for example, contain every alternate pixel location in one or both of the horizontal and vertical dimensions. Use of such an acceleration template would correspond to conventional sub-sampling by decimation.

It is appreciated that in FIG. 5, there are two different acceleration templates, a source acceleration template and a target acceleration template. Set 42 operates as the source acceleration template, while set 44 operates as a target acceleration template.

Moreover, the acceleration template used does not have to be uniform throughout the region. One can select the shape of the acceleration template, for example, so as to vary with the horizontal i-coordinate and the vertical j-coordinate, in order to better match the true nature of the warp equations (3) and (4). It can also vary with the zoom level, which is determined by the viewing parameter d.

Specifically, it can be seen from equations (3) and (4) that the non-linear effect of the warp is minimal near the center of the view plane. Expanding mathematically for x≈0 and y≈0, the approximate warp equations to first order in x and y are:

$$u \approx U_0 + Rx/[d \cos(a)], \quad v \approx V_0 + ry/[d \cos^2(a)]. \tag{15}$$

This corresponds to a two-dimensional linear stretch/shrink with a stretch/shrink factor of R/[d cos(a)] in the x direction, and a stretch/shrink factor of r/[d cos²(a)] in the y direction. If r=R=d and a=0, for example, so that the view plane is tangent to the panorama cylinder, then these two shrink/stretch factors are both equal to one.

This same first order approximation can be made for x and y centered at any other point $(x_0, y_0)$, other than (0, 0), by calculating partial derivatives of u and v with respect to x and y, and results again in a two-dimensional local linear approximation. The acceleration template can be chosen based on the local approximate stretch/shrink factors. As is known to those skilled in the art, the partial derivatives $\partial u/\partial x$ and $\partial v/\partial x$ determine a two-dimensional vector in the u-v space which approximates the effect of a unit change in x, and similarly the partial derivatives $\partial u/\partial y$ and $\partial v/\partial y$ determine a two-dimensional vector in the u-v space which approximates the effect of a unit change in y. A target acceleration template which is a rectangular array of pixel locations thus corresponds to a source acceleration template which is a parallelogram-shaped array of pixel locations, adjacent sides of the parallelogram being aligned with the two-dimensional vectors mentioned above, determined from the partial derivatives of u and v with respect to x and y.

As the zoom factor increases, the spacing between pixel locations in the acceleration template should grow.

Additionally, since the non-linear impact of the warp is stronger near the peripheral of the view plane, the acceleration templates can be bigger (i.e. they can contain more pixel locations) near the center of the view plane, and smaller near the periphery. Thus it can be seen that the spacing and size of the acceleration template can be chosen so as to match the local linear approximation of the warp equations (3) and (4). Therefore, if the spacing and size of the acceleration template are thus chosen, the acceleration template varies with position (x, y) in the view plane and with zoom level.

There are several advantages to the present invention. First, it yields savings in computation. Second, it reduces the sizes of tables which need to be stored in memory. Third, it maintains a sharp image and preserves the panoramic appearance, thus resolving the problems mentioned above inherent with conventional sub-sampling and subsequent stretching. Fourth, in the case where the acceleration template is a connected rectangle, the steps (ii) and (iii) above of data access and copy can be carried out for contiguous blocks of data efficiently, through the use of rapid memory access functions such as the standard C function memcpy( ) residing in the <string.h> library.

A preferred use of the present invention is for a fast interactive display mode for a panorama, such as is necessary when a user is panning or zooming quickly. When the user is interacting slowly or not interacting at all, the interface processor de-activates a "hurry-up flag" to indicate that a full warp calculation should be carried out. In this case, the full equations (3) and (4) are used, and the warp is computed in its conventional form. However, when the user is interacting quickly, the interface processor sets the hurry-up flag to indicate that the fast warp described above should be carried out. This ensures that any image artifacts introduced by the use of the acceleration template will go unnoticed by the user, on account of the rapid speed of image display.

The hurry-up flag can have multiple settings, depending on how fast the user is moving. Specifically, in a preferred embodiment of the present invention, the faster the user is interacting, the larger the acceleration template should be.

For example, assuming a 1:1 zoom level, for slow speeds the full warp calculation can be carried out, for moderate speeds the accelerated warp calculation described above can be carried out with the source and target acceleration templates taken as 2×2 sets of pixel locations, for fast speeds the acceleration templates can be taken as 3×3 sets of pixel locations, and for very fast speeds the acceleration templates can be taken as 4×4 sets of pixel locations. The guiding principle here is: the faster the motion in the image, the less noticed are the artifacts, and hence the coarser the approximation can be.

It can be appreciated that the present invention enables a dynamic variable memory/speed/performance trade-off. It is not necessary to pre-set an acceleration template, or multiple acceleration templates, once and for all. Rather, an image warping renderer can select an acceleration template appropriate for its available system memory resources and processing speed at any given instant.

Similar considerations apply to memory limitations. Where there is not enough memory to store the full tables, UArray and VArray, a template size can be chosen so as to able to store the necessary tables in existing memory. For example, use of 2×2 square source and target acceleration templates reduces memory requirements for the tables by a factor of four, whereas use of 3×3 square source and target acceleration templates reduces memory requirements for the tables by a factor of nine.

Appendix B is a sample software listing for accelerated warping in accordance with a preferred embodiment of the present invention as described hereinabove.

Figure 6:
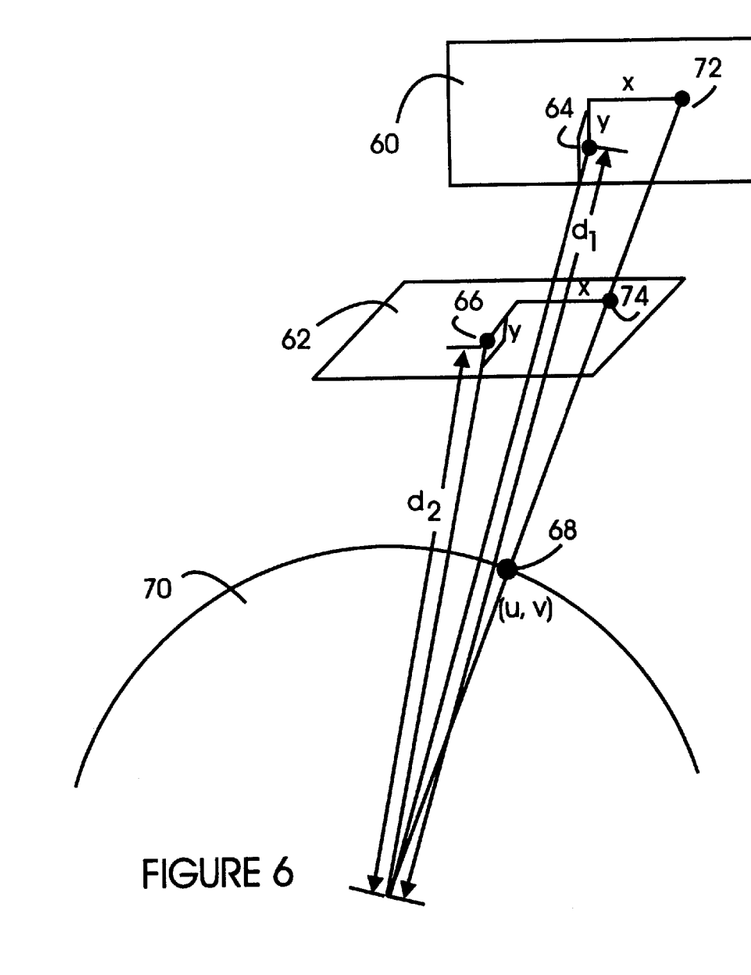
FIG. 6 is an illustration of non-centered zoom functionality in accordance with a preferred embodiment of the present invention.

Reference is now made to FIG. 6, which illustrates non-centered zoom functionality in accordance with a preferred embodiment of the present invention.

The conventional effect of zooming in or out of a panorama is accomplished by adjusting the viewing parameter d, which measures the distance from the viewer's eye to the view plane along the ray of vision, as shown in FIG. 1. By increasing d, the panorama zooms in and by decreasing d the panorama zooms out. The other viewing parameters $U_0$ and $V_0$ are not changed when zooming. Typically, whenever the user zooms in, d is multiplied by a constant factor greater than one, and whenever the user zooms out, d is divided by the constant factor. However, many modifications of this approach are used. It is noted that zoom in or out is accomplished in the prior art by changing the value of d from a pre-zoom value of $d_1$ to a post-zoom value of $d_2$.

By only adjusting the d viewing parameter, the center point of the view plane remains fixed. That is, the point with coordinates (0, 0) in the view plane corresponds to the point with coordinates ($U_0$, $V_0$) in the panorama. This is seen in equations (2)–(4) whereby setting x=y=0 corresponds to setting u=$U_0$, v=$V_0$. This type of zoom is referred to as a "centered zoom," since it zooms in at the center of the view plane and is known in the prior art.

The present invention teaches a way to perform a non-centered zoom, also referred to as a "mouse-centered zoom." Such a zoom is illustrated in FIG. 6 and is characterized by keeping a point, other than the center point, fixed in differently oriented view planes. In FIG. 6, two differently oriented, mutually zoomed view planes are indicated by reference numerals 60 and 62. View plane 60 is termed the pre-zoom view plane, while view plane 62 is termed the modified, post-zoom view plane. The center points of the two view planes are indicated respectively by reference numerals 64 and 66.

In accordance with a preferred embodiment of the present invention points, other than the center points of the two view planes, which have the same relative coordinates with respect to the center points, are also kept fixed, in that they are both mapped onto the same point, indicated by reference numeral 68 on a panorama 70. These points are indicated in FIG. 6, by respective reference numerals 72 and 74.

The point 72 in the pre-zoom view plane is preferably taken to be the point located at a mouse cursor position, hence the name mouse-centered zoom. That is, the user preferably positions the mouse cursor at the location of the displayed scene on the pre-zoom view plane where the zoom is to be effected, and then does the zoom at that point.

Technically, a non-centered zoom is more complicated than a centered zoom. Given the coordinates of the (x, y) of the mouser cursor, to carry out a non-centered zoom at the point (x, y), so that this point remains fixed, it is necessary to recalculate all three of the viewing parameters $U_0$, $V_0$, and d.

Specifically, if $d_1$ denotes the value of d before the zoom, and $d_2$ denotes the value of d after the zoom as described above, then it is necessary to solve for $U_0$ and $V_0$ in equations (3) and (4) so that the values x, y, u and v are the same when d is set to $d_1$ and when d is set to $d_2$. This ensures that the specified mouse cursor point (x, y) corresponds to the same point (u, v) on the panorama before and after the zoom takes place.

Thus it can be appreciated that to carry out the non-centered zoom, it is necessary to first compute u and v from equations (3) and (4) with the pre-zoom choice $d=d_1$, and then, using these values of u and v, to solve equations (3) and (4) for the unknowns $U_0$ and $V_0$ with the post-zoom choice $d=d_2$. This can be carried out numerically using one of several iterative methods known in the art, such as fixed point iterations or Newton-Raphson iterations. These and other conventional numerical methods are described in Elementary Numerical Analysis: An Algorithmic Approach by S. D. Conte and C. De Boor (McGraw-Hill, 1972), which is hereby incorporated by reference.

Alternatively, the present invention discloses an explicit solution as follows. It can be seen from FIG. 2 that if (x, y) and (u, v) are to remain fixed, then the ratio $y^*/(X^2+y^2+d^2)^{1/2}$ remains invariant as d changes from $d=d_1$ to $d=d_2$. That is, $$[y\cos(a_2) + d_2\sin(a_2)]/(x^2 + y^2 + d_2^2)^{1/2} = [y\cos(a_1) + d_2\sin(a_1)]/(x^2 + y^2 + d_1^2)^{1/2}. \quad (16)$$

Here $a_1$ and $a_2$ denote the respective angles of elevation before and after the zoom, as in equation (2). In fact, this common ratio in equation (16) is equal to $v/(r^2+v^2)^{1/2}$, as can be seen from FIG. 2 using similar triangles. This can also be verified analytically from equations (3) and (4).

Since the right-hand side of equation (16) is known, it can be used to solve for the angle $a_2$ directly, from which $V_0$ can be determined by $$V_0 = r \tan(a_2). \quad (17)$$

It is noted that equation (16) de-couples the two unknowns $U_0$ and $V_0$. That is, whereas the equations (3) and (4) represent a system of two equations for the two unknowns $U_0$ and $V_0$, in contrast equation (16) represents a single equation for the single unknown $a_2$, or equivalently, for $V_0$, by means of equation (17).

Equations (16) and (17) can be used to solve for $V_0$ explicitly, as follows. Denote $$c=[y \cos(a_1)+d \sin(a_1)]/(x^2+y^2+d_1^2)^{1/2}. \quad (18)$$

Then $V_0$ is given by $$V_0 = r\{cd_2 - y[(y^2 + d_2^2)/(x^2 + y^2 + d_2^2) - c^2]^{1/2}\}/ \{cy + d_2[(y^2 + d_2^2)/(x^2 + y^2 + d_2^2) - c^2]^{1/2}\}. \quad (19)$$

Once $V_0$ is determined, $U_0$ is then determined by adding the quantity $$R \tan^{-1}\{x/[d_1 \cos(a_1)-y \sin(a_1)]\} - R \tan^{-1}\{x/[d_2 \cos(a_2)-y \sin(a_2)]\} \quad (20)$$

to the pre-zoom value of $U_0$. This corresponds to the change in $R \tan^{-1}(x/d^*)$, per equations (3) and (4).

Sample software for carrying out the non-centered zoom in accordance with a preferred embodiment of the present invention is presented in Appendix C. As can be seen in the code listing, the member function SetWarpParametersforZoom( ) takes as an input a point, ptM, with coordinates ptM.x and ptM.y, indicating the position of the mouse cursor, and computes values for U0 and V0. It can be appreciated that the computation may be carried out by other numerical algorithms well known to those skilled in the art, to solve the system of equations (3) and (4) for the unknowns U0 and V0, as described above.

Figure 7:
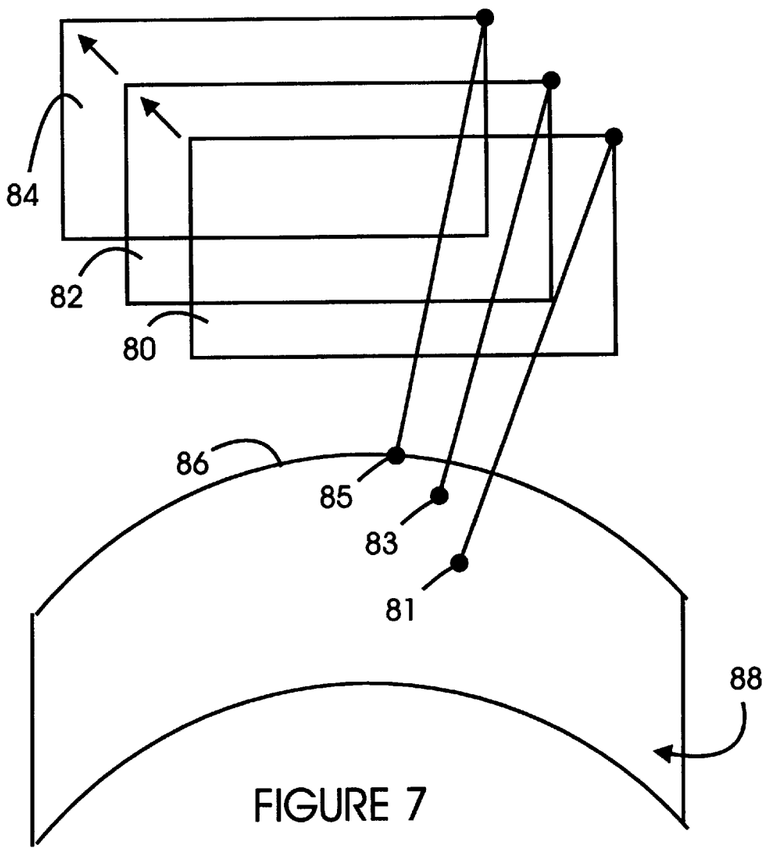
FIG. 7 is an illustration of boundary window control functionality in accordance with a preferred embodiment of the present invention.

Reference is now made to FIG. 7, which is an illustration of boundary window control functionality in accordance with a preferred embodiment of the present invention. FIG. 7 shows a plurality of view planes 80, 82 and 84, the upper right corners of which map to pixel locations 81, 83 and 85 which increasingly approach the top boundary 86 of a panorama 88. The present invention enables control of view plane generation such that the view planes do not map to locations beyond the boundaries of the panorama.

As illustrated in prior art FIG. 4, conventional warping takes place by mapping a source region 36 from the given digital panorama into a target display region 40 for the view plane. The panorama source region 36 and the target display region 40 are not in one-to-one pixel correspondence. As the user interactively pans and zooms, thereby effecting changes in the target display region 40, the source region 36 also changes, according to equations (13a), (13b), (14a) and (14b) above. The relationship between the regions 36 and 40 is not simple, and in particular it is not clear what the limits of the region 40 are. That is, the digital panorama 10 (FIG. 1) comes with certain given pixel dimensions, and it is not clear how high or low the user can pan at any given zoom level, so as not to have the window 36 go out of bounds of the panorama.

The present invention provides a method and system for calculating, at any given zoom level, the smallest and largest values of $V_o$ which ensure that the source region remains within the pixel dimension limits of the digital panorama. Then, by using these values, whenever the user interactively adjusts the display window 40 by panning up or down, the system can limit the window's vertical position based on the smallest and largest admissible values for $V_0$.

In accordance with a preferred embodiment of the present invention, the vertical dimension of the view plane (in pixels) is denoted by 2Y. It can be seen from equations (3) and (4) that the smallest and largest values of v are given by $$v_s = r[d \tan(a)-Y]/[d+Y \tan(a)], \quad (21)$$

and $$v_L = r[d \tan(a)+Y]/[d-Y \tan(a)], \quad (22)$$

respectively. These equations can be solved for tan(a) in terms of $v_S$ and $v_L$, and then $V_0$ can be determined from equation (2). Specifically, equation (21) can be inverted to yield $$V_0 = r(dv_s+rY)/(dr-v_sY), \quad (23)$$

and equation (22) can be inverted to yield $$V_0 = r(dv_L-rY)/(dr+v_LY). \quad (24)$$

In accordance with an embodiment of the present invention, the limits $v_S$ and $v_L$ are set respectively to the lower and upper limits of the vertical panorama dimension, relative to the line of sight. For example, if the panorama is centered vertically, so that the viewer's eye is at the same height as the middle of the panorama, then $v_S$ and $v_L$ should be taken as $-H/2$ and $+H/2$, respectively, where H denotes the full height (in pixels) of the digital panorama.

When the above described template acceleration system of the present invention is used, it is necessary to reduce $v_L$ by the height of the rectangular template, in order to ensure that the lower left hand corner of the template rectangle can be positioned at height v, without any of the pixels spilling over the top of the panorama.

In a preferred embodiment of the present invention, the value of $V_0$ based on equation (23) is taken as the minimum possible value for this parameter, and the value of $V_0$ based on equation (24) is taken as the maximum possible value of this parameter. These values are stored and used until the viewing distance d changes, at which point new values are computed through equations (23) and (24).

Whenever the user makes an interactive request for panning or zooming motion, thereby requiring a change in the view plane, the requested value of $V_0$ is compared with the currently stored minimum and maximum values. If the requested value of $V_0$ is less than the stored minimum value, $V_0$ is set equal to the stored minimum value. If the requested value of $V_0$ is greater than the stored maximum value, $V_0$ is set equal to the stored maximum value. Otherwise, the requested value of $V_0$ lies between the minimum and maximum values, and then $V_0$ is set equal to the requested value. After the appropriate value for $V_0$ is arrived at as described above, the bitmap for the view plane is built using the warp equations (3) and (4) above, based on the viewing parameters $U_0$, $V_0$ and d.

This embodiment ensures that when building the bitmap for the view plane, the warping equations do not require access to pixel data outside the dimensions of the digital panorama. It also ensures that if the user is panning in a direction with both a vertical and horizontal component, such as in a 45° direction, then whenever he reaches the limits of the panorama, the vertical motion will stop, but the horizontal motion will nevertheless continue. Thus it can be seen that the user does not have to realize that he is at the top or bottom of the panorama and correspondingly adjust his panning direction. As long as his panning direction has a horizontal component, the motion continues.

The above discussion relates to a digital panorama represented by a cylindrical environment map. In such a map, the panorama is represented by the two coordinates on the surface of the cylinder; namely, the horizontal angle of rotation and the vertical elevation. Other environment maps can also be used. For example, in a spherical environment map, the scene is represented by the two coordinates on the surface of the sphere; namely, the horizontal and vertical angles of rotation. Similarly, in cubical environment maps, the scene is represented by the two planar coordinates on one or more of the six faces of the cube.

The dynamic viewing parameters $U_0$ and $V_0$ referenced above for the cylindrical map are generally replaced by the environment map parameters for the specific environment map being used. That is, in general the three dynamic viewing parameters which determine the view plane, are the two coordinates of the environment map through which passes the ray of vision, which is perpendicular to the view plane, and the distance d of the view plane from the viewer's eye, as measured along the ray of vision. The two coordinate parameters are dynamically changed in response to interactive panning, and the distance parameter d is dynamically changed in response to zooming in and out.

It is apparent to those of ordinary skill in the art that the present invention applies to spherical, cubical and other types of environment maps as well. For each of these types of environment maps, the rendering step involves mapping color or monochromatic values from the environment map to the view plane, as illustrated in prior art FIG. 4, through the use of equations analogous to equations (3) and (4) above. Thus, for each of these types of environment maps, source and target acceleration templates as described above with reference to FIG. 5 can be employed.

Similarly, for each of these types of environment maps, one can use the equations which are analogous to equations (3) and (4) to formulate the condition for a non-centered zoom, and then solve for the modified viewing parameters so as to keep fixed a specified point, as illustrated in FIG. 6.

It will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

APPENDIX A

(PRIOR ART)

```
void
BMP::findLogicalWindow(short U0, short V0, double d, CSize sPhys, CRect& rcLog) const
{
    short    Origin     = biHeight / 2;              // central height of panorama cylinder
    double   r          = biWidth / (2 * PI);        // radius of panorama cylinder
    double   t          = (V0 - Origin) / r;
    double   phi        = atan(t);                   // angle of visual elevation
    double   Y0         = 0.5 * (sPhys.cy - 1);
    double   X0         = 0.5 * (sPhys.cx - 1);
    double   yt         = r * (d * t + Y0) / (d - Y0 * t);
    double   yb         = r * (d * t - Y0) / (d + Y0 * t);
    double   Ub         = atan(X0 / (d + Y0 * t) / cos(phi));
    double   Ut         = atan(X0 / (d - Y0 * t) / cos(phi));
    short    Ur         = (Ub > Ut)  ? short (r * Ub) : short(r * Ut);
    short    Vb         = (yb < 0)   ? short (yb) : short(yb * cos(Ub));
    short    Vt         = (yt > 0)   ? short (yt) : short(yt * cos(Ut));
    rcLog.right         = U0 + Ur + 1;               // right   side of viewable portion of cylinder
    rcLog.left          = U0 - Ur;                   // left    side of viewable portion of cylinder
    rcLog.top           = Origin + Vb;               // bottom  side of viewable portion of cylinder
    rcLog.bottom        = Origin + Vt + 1;           // top     side of viewable portion of cylinder
}   /* BMP::findLogicalWindow */
void
BMP::Warp(short U0, short V0, double d, CSize sPhys, CRect rcLog, BMP& B, BMP& T)
    short    i, j;
    long     jLim       = (sPhys.cx + 1) / 2;
    if (!UArray)
    {
        UArray = new double[sPhys.cy * jLim];
        VArray = new  long[sPhys.cy * jLim];
    }
    double*  pU         = UArray;
```

APPENDIX A-continued (PRIOR ART)

```
    long*       pV          = VArray;
if (d != dold || V0 != Vold)                        // calculate tables only when V0 or d changes
{
    Vold                    = V0;
    dold                    = d;
    short       Origin      = biHeight / 2;         // central height of panorama cylinder
    double      r           = biWidth / (2 * PI);   // radius of panorama cylinder
    double      t           = (V0 - Origin) / r;
    double      phi         = atan(t);              // angle of visual elevation
    double      X0          = 0.5 * (sPhys.cx - 1); // X-center of window in vertical plane
    double      Y0          = 0.5 * (sPhys.cy - 1); // Y-center of window in vertical plane
    short       alignmentT  = T.biWidth % 4;        // alignment for input bitmap
    alignmentT += T.biWidth * 3;                    // total size of input bitmap
    double      cosTerm     = 1 / cos(phi);
    double      Utemp, y;
    double      numer       = d * t - Y0;
    double      denom       = d + Y0 * t;
    long        shiftV      = Origin - rcLog.top;
    for (long i = 0; i < sPhys.cy; i++, denom -= t, numer += 1)
    {
        y                   = r * numer / denom;
        for (long j = 0; j < jLim; j++)
        {
            Utemp           = atan((X0 - j) / denom * cosTerm);
            *pU++           = r * Utemp;
            *pV++           = alignmentT * (long)(shiftV + y * cos(Utemp));
        }
    }
}
unsigned char*  pB1         = B.bArray;
unsigned char*  pB2;
unsigned char*  pT;
short           U1, U2;
long            pStep       = 3 * sPhys.cx;
long            shiftU      = U0 - rcLog.left;
short           alignment   = sPhys.cx % 4;         // alignment for output bitmap
alignment += 3  * sPhys.cx / 2;
pU                          = UArray;
pV                          = VArray;
for (i = 0; i < sPhys.cy; i++)
    {
        pB2                 = pB1 + pStep;
        for (j = 0; j < jLim; j++, pU++, pV++)
        {
            U1              = (short)(shiftU - *pU);
            U2              = (short)(shiftU + *pU);
            pT              = T.bArray + *pV + 3 * U1;
            *pB1++ = *pT++;
            *pB1++ = *pT++;
            *pB1++ = *pT;
            pT += 3 * (U2 - U1);
            *--pB2 = *pT--;
            *--pB2 = *pT--;
            *--pB2 = *pT;
        }
        pB1 += alignment;
    }
}   /* BMP::Warp */
```

APPENDIX B

```
void
BMP::SetWarpTables(CSize sPhys, CSize sFullSize, OliMultiFragImage& sourceImage, SFrame& sframe, short lowQuality)
{
    if  (!m_UArray || !m_VArray || !m_UAngle || !m_UCosine)
            return FALSE;
    double      xScale      = sFullSize.cx / (3.1415926535 * 2);
    long        jLim        = (sPhys.cx + 1) / 2;
    m_Vold = sframe.V0;
    m_dold = sframe.d;
    double      t           = (sframe.V0 - sframe.Origin) / sframe.r;
    double      phi         atan(t);                // angle of visual elevation
    double      X0          = 0.5 * (sPhys.cx - 1); // X-center of window in vertical plane
    double      Y0          = 0.5 * (sPhys.cy - 1); // Y-center of window in vertical plane
```

APPENDIX B-continued

```
        double      cosTerm       = 1 / cos(phi);
        long        shiftV        = sframe.Origin + sourceImage.GetYSrc( ) - sframe.rcLogicalWindow.top;
        double*     pU            = m_UArray;
        long*       pV            = m_VArray;
        double      numer         = sframe.d * cosTerm * t - Y0;
        double      denom         = sframe.d * cosTerm + Y0 * t;
        short       inc_y         = 1;
        short       inc_x         = 1;
        if   (lowQuality)
        {
            inc_x = lowQuality;
            inc_y = lowQuality;
        }
        double Utemp;
        for (long i = 0; i < sPhys.cy; i += inc_y, denom -= (inc_y*t), numer += inc_y)
        {
            double y              = sframe.r * numer / denom;
            for (long j = 0; j < jLim; j += inc_x)
            {
                Utemp             = atan((X0 - j) / denom * cosTerm);
                *pU++             = xScale * Utemp;
                *pV++             = long(shiftV + y * cos(Utemp));
            }
        }
}   // BMP::SetWarpTables
void
BMP::FastWarp(CSize sPhys, CSize sFullSize, OliMultiFragImage& sourceImage, SFrame& sframe, short lowQuality)
{
        short       inc_y         = 1;
        short       inc_x         = 1;
        if    (lowQuality)
        {
            inc_x = lowQuality;
            inc_y = lowQuality;
        }
        if (sframe.d != m_dold || sframe.V0 != m_Vold)          // calculate tables only when V0 or d changes
              if   (!SetWarpTables(sPhys, sFullSize, sourceImage, sframe, lowQuality))
                      return FALSE;
        double*     pU            = m_UArray;
        long*       pV            = m_VArray;
        long        shiftU        = sframe.U0 + sourceImage.GetXSrc( )- sframe.rcLogicalWindow.left;
        long        jLim          = (sPhys.cx + 1) / 2;
        short       U1, U2;
        for         (long i = 0; i < sPhys.cy; i += inc_y)
              for   (long j = 0; j < jLim; j += inc_x, pU++, pV++)
              {
                  long U          = long(*pU);
                  long V          = *pV;
                  U1              = (short)(shiftU - U);
                  U2              = (short)(shiftU + U);
                  SetPixel(sourceImage, j, i, U1, V, inc_x, inc_y);
                  SetPixel(sourceImage, sPhys.cx - j - inc_x, i, U2, V, inc_x, inc_y);
              }
}   // BMP::FastWarp
```

APPENDIX C

```
void
BMP::SetWarpParametersForZoom(CPoint ptM, CSize sFullSize)
{
        double    initZoom     = 1.2 * sPhysWindow.cy / sFullSize.cy;
        double    phi          = atan((V0 - Origin) / r);
        double    sqrsum       = ptM.x*ptM.x + ptM.y*ptM.y;
        double    lambda       = (ptM.y * cos(phi) + d * sin(phi)) / sqrt(sqrsum + d*d);
        double    xterm1       = atan(ptM.x / (d*cos(phi) - ptM.y*sin(phi)));
        d                      = initZoom * r * sPhysWindow.cx / rcLogicalWindow.Width( );
        double    sqrterm      = sqrt((ptM.y*ptM.y + d*d) / (sqrsum + d*d) - lambda*lambda);
        double    V            = (d*lambda - ptM.y*sqrterm) / (ptM.y*lambda + d*sqrterm);
        V0                     = short(Origin + V + 0.5);
        phi                    = atan((V0 - Origin) / r);
        double    xterm2       = atan(ptM.x / (d*cos(phi) - ptM.y*sin(phi)));
        U0                     = short(U0 + xterm1 - xterm2);
}   BMP::SetWarpParametersForZoom
```

We claim:

1. A method for transforming a source digital image into a target digital image to produce an effect of warping comprising:

identifying a subset of pixel locations within all pixel locations of said target image;

identifying pixel locations within said source image associated with each pixel location within said subset of pixel locations; and copying pixel attribute values from a source neighborhood of each pixel location within said source image, said source neighborhood being defined by means of a source acceleration pixel template, into pixel attribute values for the corresponding pixel locations in a target neighborhood of each pixel location within said subset of pixel locations, said target neighborhood being defined by means of a target acceleration pixel template containing at least two pixel locations.

2. A method according to claim 1 and wherein at least one of said source acceleration template and said target acceleration template varies depending on the speed with which a user is panning or zooming on said source image.

3. A method according to claim 1 and wherein at least one of said source acceleration template and said target acceleration template varies depending on available memory for storing necessary data.

4. A method according to claim 1 and wherein at least one of said source acceleration template and said target acceleration template varies depending on placement of said pixel location within said source image.

5. A method according to claim 1 and wherein at least one of said source acceleration template and said target acceleration template varies depending on a zoom level.

6. A method according to claim 1 and wherein at least one of said source acceleration template and said target acceleration template is determined by a desired quality level.

7. A method according to claim 1 and wherein said source digital image is a digitized environment map of a scene.

8. A method according to claim 1 and wherein said source digital image is a frame of a movie.

9. A digital image processing system for transforming a source digital image into a target digital image to produce an effect of warping comprising:

an address generator for identifying a subset of pixel locations within all pixel locations of said target image;

an address generator for identifying pixel locations within said source image associated with each pixel location within said subset of pixel locations; and a memory manager operative to copy pixel attribute values from a source neighborhood of each pixel location within said source image, said source neighborhood being defined by means of a source acceleration pixel template, into pixel attribute values for corresponding pixel locations in a target neighborhood of each pixel location within said subset of pixel locations, said target neighborhood being defined by means of a target acceleration pixel template containing at least two pixel locations.

10. The system according to claim 9 and wherein at least one of said source acceleration template and said target acceleration template varies depending on the speed with which a user is panning or zooming.

11. The system according to claim 9 and wherein at least one of said source acceleration template and said target acceleration template varies depending on available memory for storing necessary data.

12. The system according to claim 9 and wherein at least one of said source acceleration template and said target acceleration template varies depending on placement of said pixel locations within said source image.

13. The system according to claim 9 and wherein at least one of said source acceleration template and said target acceleration template varies depending on a zoom level.

14. The system according to claim 9 and wherein at least one of said source acceleration template and said target acceleration template is determined by a desired quality level.

15. The system according to claim 9 and wherein said source digital image is a digitized environment map of a scene.

16. The system according to claim 9 and wherein said source digital image is a frame of a movie.

17. A method for interactively zooming in or out of a digitized scene being projected on a view surface while keeping fixed a specified point in said view surface located other than at the center of said view surface, comprising:

identifying said specified point in said view surface;

identifying a pre-zoom and post-zoom viewing distance from said view surface; and computing a modified view surface in such a manner that said specified point in said modified view surface maps to the same point in the digitized scene when using either said pre-zoom or said post-zoom viewing distance.

18. A method according to claim 17 and wherein said specified point in said view surface corresponds to the position of a mouse cursor.

19. A method according to claim 17 and wherein computing a modified view surface includes computing of at least one of modified vertical view elevation and modified horizontal view angle.

20. A method according to claim 17 and wherein said digitized scene is a digitized environment map of a scene.

21. A method according to claim 17 and wherein said digitized scene is a frame of a movie.

22. A method according to claim 17 and wherein said view surface is a view plane.

23. A digital image processing system for interactively zooming in or out of a digitized scene being projected on a view surface while keeping fixed a specified point in said view surface located other than at the center of said view surface, comprising:

a spatial coordinate register for storing spatial coordinates of said specified point;

viewing distance registers for storing the values of the pre-zoom and post-zoom viewing distances from said view surface; and a processor for computing a modified view surface in such a manner that said specified point whose spatial coordinates are stored in said spatial coordinate register maps to the same point in the digitized scene when using either said pre-zoom or said post-zoom viewing distance, the values of which are stored in said viewing distance registers.

24. The system according to claim 23 and wherein said specified point whose spatial coordinates are stored in said spatial coordinate register corresponds to the position of a mouse cursor.

25. The system according to claim 23 and wherein said processor computes at least one of modified vertical view elevation and modified horizontal view angle.

26. The system according to claim 23 and wherein said digitized scene is a digitized environment map of a scene.

27. The system according to claim 23 and wherein said digitized scene is a frame of a movie.

28. The system according to claim 23 and wherein said view surface is a view plane.

29. A method for controlling interactive warping of a digital panorama image for displaying a projected view of said panorama on a view surface, so that the projected view does not require access to pixel data outside the dimension limits of said panorama, said projected view being determined by viewing parameters including a vertical elevation viewing parameter and a distance viewing parameter, the method comprising:

calculating minimum and maximum values for said vertical elevation viewing parameter for a given value of said viewing distance parameter;

comparing a requested value of said vertical elevation viewing parameter with said minimum and maximum values;

adjusting said requested value of said vertical elevation viewing parameter so that it does not fall below or above said minimum and maximum values, respectively; and warping the panorama based at least on the adjusted vertical elevation viewing parameter.

30. A method according to claim 29 and wherein said view surface is a view plane.

31. An image processing system for controlling interactive warping of a digital panorama image for displaying a projected view of said panorama on a view surface, so that the projected view does not require access to pixel data outside the dimension limits of said panorama, said projected view being determined by viewing parameters including a vertical elevation viewing parameter and a distance viewing parameter, the system comprising:

a processor for calculating minimum and maximum values for said vertical elevation viewing parameter for a given value of said viewing distance parameter;

a logic processing unit for comparing a requested value of said vertical elevation viewing parameter with said minimum and maximum values;

an arithmetic unit for adjusting said requested value of said vertical elevation viewing parameter so that it does not fall below or above said minimum and maximum values, respectively; and a renderer for warping the panorama based at least on the adjusted vertical elevation viewing parameter.

32. The system according to claim 31 and wherein said view surface is a view plane.

* * * * *